March 14, 1939. R. R. CHAPPELL ET AL 2,150,489
TOTALIZING AND RECORDING APPARATUS
Filed Oct. 2, 1936  2 Sheets-Sheet 1

INVENTORS.
RALPH R. CHAPPELL
RUTGER B. COLT
BY Stephen Gerstvik
ATTORNEY.

March 14, 1939.   R. R. CHAPPELL ET AL   2,150,489
TOTALIZING AND RECORDING APPARATUS
Filed Oct. 2, 1936   2 Sheets-Sheet 2

INVENTORS.
RALPH R. CHAPPELL
RUTGER B. COLT
BY Stephen Cerstvik
ATTORNEY.

Patented Mar. 14, 1939

2,150,489

UNITED STATES PATENT OFFICE 2,150,489

TOTALIZING AND RECORDING APPARATUS

Ralph R. Chappell, Richmond, Va., and Rutger B. Colt, Baltimore, Md., assignors to Bendix Aviation Corporation, South Bend, Ind., a corporation of Delaware Application October 2, 1936, Serial No. 103,758

4 Claims. (Cl. 234—65)

This invention relates to precision instruments and more particularly to means for transmitting, registering, and recording measurable unit movements of a member such as the revolutions of a rotatable shaft or the like.

One of the objects of the present invention is to provide novel apparatus embodying common means for controlling the operation of a counter and recording mechanism adapted to produce a readily readable record of the revolutions of a rotatable member or of the force actuating said member.

Another object is to provide a novel wind intensity measuring device whereby the total number of miles of wind passing the same may be registered on a counter and a readily readable permanent record made of said total, the latter being made against time if desired in order that the average velocity of the wind may be determined therefrom.

A further object is to provide simple and inexpensive apparatus whereby the total number of miles of wind passing a given point may be determined and electrically transmitted by means of a common circuit to actuate both a totalizing counter and a recording mechanism in a novel manner.

The above and further objects and novel features of the invention will more fully appear from the following detailed description when the same is taken in connection with the accompanying drawings. It is to be expressly understood, however, that the drawings are for the purpose of illustration only and are not intended to define the limits of the invention, reference being primarily had for this latter purpose to the appended claims.

In the drawings, wherein like reference characters refer to like parts throughout the several views.

Figure 1:
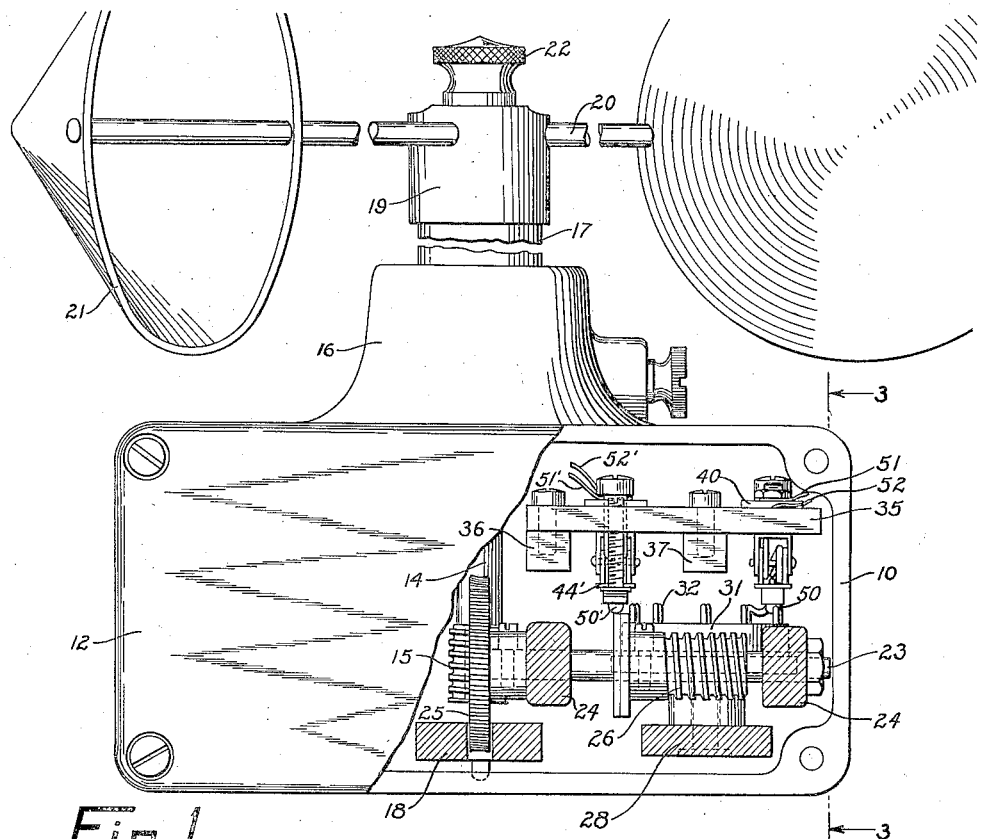
Fig. 1 is a side elevation, partly in section and with parts broken away, of an anemometer embodying one form of the present invention, the section being taken substantially on line 1—1 of Fig. 3.
Figure 2:
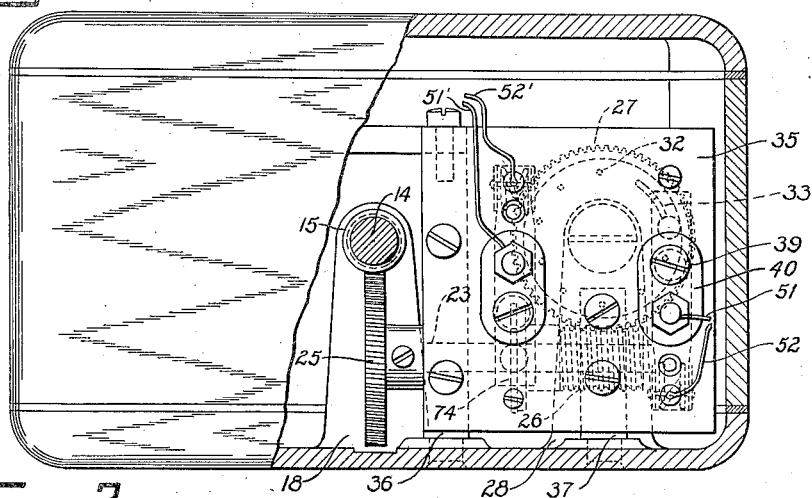
Fig. 2 is a top plan, partly in section and with parts broken away, of the casing and contents thereof of the device of Fig. 1.

Only a single embodiment of the invention is illustrated in the drawings, by way of example, in combination with an anemometer, the operation of which is indicative of the number of miles of wind passing a given point. In general, the apparatus shown comprises means adapted to be rotated in response to wind currents, the number of revolutions being proportional to the number of miles of wind passing the apparatus and the speed of rotation of said means being proportional to the wind velocity, a totalizing counter for registering the number of miles of wind which passes the anemometer, recording means for making a permanent record of the number of miles of said wind passing, said record being such that one indication in every ten, or other predetermined number, is readily distinguishable from the intermediate indications, thereby making a summation of the indications a comparatively easy task, and common electric transmission means interposed between the anemometer and said counter and recorder, whereby the latter two may be installed at stations remotely located from said anemometer.

In the illustrated embodiment, the anemometer which is of the plural-cup, rotating type is rotatably supported by a casing or housing 10 having removable side plates or covers 11 and 12. A spindle 14 having a worm 15 rigidly secured to the lower end thereof within casing 10 extends upwardly through a bearing housing 16, which is shown only in Fig. 1, and which may be secured to or formed integrally with casing 10, and through an upwardly extending hollow sleeve or tube 17 which may be of any suitable length. Spindle 14 is rotatably mounted by the usual or any of various suitable well-known means (not shown) in housing 16 and sleeve 17. Additionally, the lower end of the spindle may engage supporting arm 18 which is shown as being cast integrally with cover 12.

A hub 19, having a plurality of arms 20 extending somewhat radially therefrom and carrying anemometer cups 21 at their outer ends is removably secured to the upper end of spindle 14 for rotation therewith by any suitable means such as splines (not shown) and held against removal from the spindle by means of a knurled nut 22 in the usual manner. Cups 21 are so designed as to shape and size that, when the same are loaded or resisted by the mechanism to be hereinafter described, the same will impart an angular velocity to spindle 14 which is proportional to the speed of the wind currents impinging upon said cups and the total number of revolutions imparted to said spindle by the cups will constitute a measure of the number of miles of wind which passes or impinges upon said cups.

Novel means are provided in casing 10 whereby indications representing the number of miles of wind which pass cups 21 may be electrically transmitted to remote stations, said means being such that the electrical impulses or indications may be transmitted over a single transmitting circuit to actuate both a totalizing counter and a recording mechanism, the latter of which produces a record which may be quickly read with little or no possibility of error. Said means are simple in construction, inexpensive to manufacture, and are mounted in casing 10 in such a manner that access thereto for cleaning, repair, or adjustment of parts is facilitated. In the form shown, said means comprises a horizontal shaft 23 rotatably mounted in bearings formed in a pair of rigid supporting arms 24, 24 which are formed as integral parts of removable side cover 12. Mounted on one end of shaft 23 is a worm gear 25 which is in constant mesh with worm 15 whereby said shaft is rotated at a speed proportional to but slower than spindle 14. Preferably, shaft 23 makes 10 revolutions for each mile of wind which passes.

Figure 3:
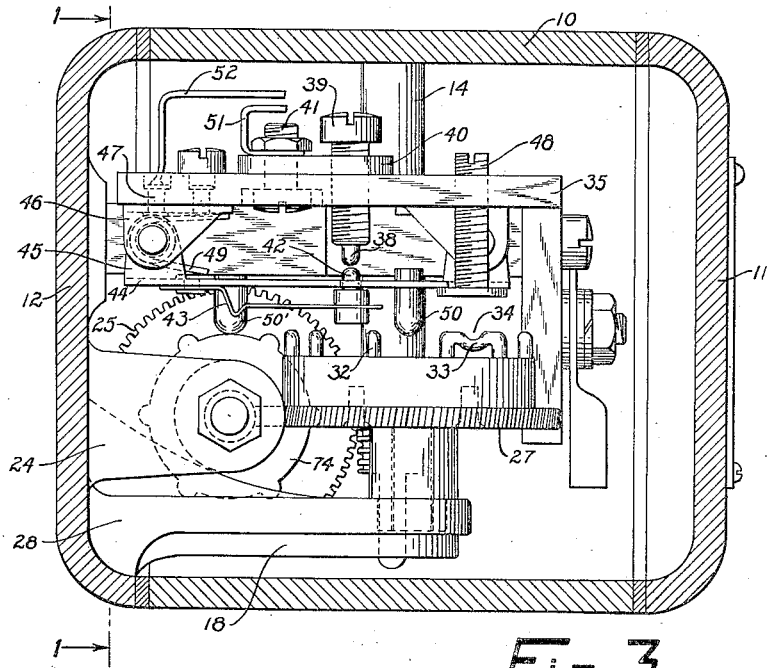
Fig. 3 is an end view on an enlarged scale and partly in section, the section being taken substantially on line 3—3 of Fig. 1.
Figure 4:
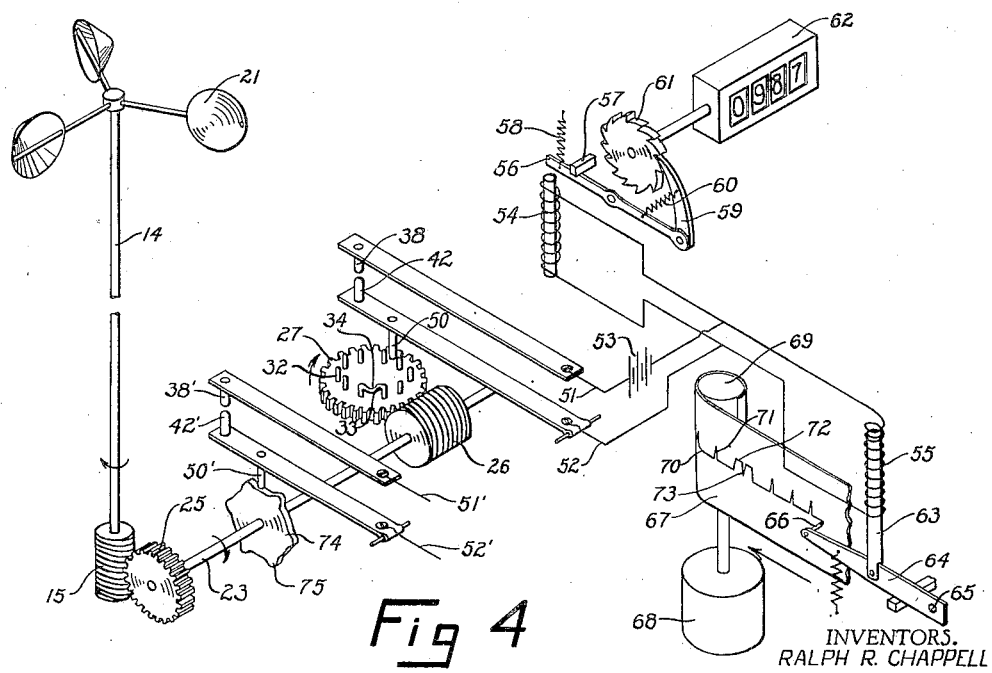
Fig. 4 is a diagrammatic view showing the illustrated embodiment of the invention.

Also mounted on shaft 23 intermediate the ends thereof and for rotation therewith is a worm 26 which is adapted to constantly mesh with a horizontally disposed worm gear 27 that is rotatably supported in any suitable manner on a shelf 28. The speed reduction ratio between worm 26 and worm gear 27 is a matter of choice and may be varied to obtain the particular results sought. For the purposes of description, it will be assumed that said ratio in the illustrated embodiment is 100 to 1, i. e., that gear 27 is adapted to make one revolution for every 100 revolutions of shaft 23. Secured to the upper surface of gear 27 by any suitable means, such as screws, is an insulating ring or block 31 on the upper face of which is provided a plurality of vertical pins or cam members 32. For a purpose to fully appear hereafter members 32 are preferably secured to ring 31 adjacent the periphery thereof and are equally spaced on the circumference of a circle which is concentric with the periphery of the ring. Ten members 32 are shown in the illustrated embodiment, the arcuate distance between each being such as to subtend an angle at the center of said circle which is equal to the angular distance through which gear 27 moves for every 10 revolutions of shaft 23, or the number of revolutions said shaft is rotated by a predetermined number of miles of wind, preferably one. The upper ends of two of the members 32 which are adjacent one another are joined, as is best seen in Figs. 3 and 4, by a cross-piece 33 to constitute a bridge, said cross-piece having a dip or groove 34 intermediate the ends thereof.

In the illustrated embodiment, pins 32 are adapted to successively engage electric switch means in such a manner that said means, upon the rotation of gear 27 by worm 26, will be momentarily closed at the end of each of nine successive series of 10 revolutions each of shaft 23, and closed during every tenth series of ten revolutions of said shaft except momentarily when the same is permitted to open. Said switch means, in the form shown, are mounted on an insulating contact plate 35 which is supported in the upper portion of housing 10 by a pair of arms 36, 37 that are removably secured to and extend inwardly from side cover plate 12. One contact 38 of said switch means is constituted by the lower end of a contact screw 39 which has threaded engagement with a terminal bar or plate 40 that is secured to plate 35 by a terminal bolt 41. The other contact 42 of said switch means is mounted on a leaf spring 43 and extends upwardly through an opening in a bar 44 to which one end of said spring is secured by a rivet or other suitable means. Bar 44 is provided with a pair of ears constituting a yoke 45 by means of which said bar is pivotally suspended from a bifurcated bracket 46 that is secured to the lower surface of plate 35 by means of rivets 47. The other end of bar 44 is normally held by a spring 49 in engagement with the flanged head of a stop screw 48 which is adjustably mounted in plate 35.

For the purpose of periodically moving contacts 38 and 42 into engagement with each other, a stud or cam member 50 is secured to and depends from arm 44 adjacent the free end thereof. The lower end of said member is bevelled or rounded and extends slightly below the plane of the rounded tops of pins 32 and bridge 33, 34 and in the path of movement thereof. Thus, when gear 27 is rotated, pins 32 engage member 50 to thereby lift bar 44 which, in turn, lifts spring 43 and carries contact 42 into yielding engagement with contact 38. The circuit in which said contacts are connected is thus closed and the current flows from lead 51 through bar 40, contacts 38, 42, springs 43 and 49, rivet 47, lead 52, and thence through a transmitting circuit which will be next described.

Switch contacts 38 and 42 are connected in a transmitting circuit for conveying electrical impulses to remote stations for controlling the operations of both a totalizing counter and recording mechanism in a novel manner, said circuit, as shown, comprising, in addition to the parts already described, a source of electrical energy such as battery 53 (Fig. 4) and a pair of electromagnet coils 54 and 55 which may be connected either in series or in parallel with each other. Coil 54 is provided with a stationary core and is adapted when energized to attract the free end of a pivoted lever 56 which is normally held against a stop 57 by means of a spring 58. A pawl 59, pivoted to the other end of lever 56 is held by means of a spring 60 in engagement with a ratchet wheel 61 that is secured to the shaft of a totalizing counter 62. Thus, when and only when the circuit is closed at contacts 38, 42, counter 62 is actuated to add an additional mile of wind to the sum already registered on the face thereof.

A movable core 63 is provided in coil 55 and is pivotally secured at its lower end to an arm 64 which is, in turn, pivoted at 65 and carries a recording stylus 66 at the free end thereof, said stylus being in constant engagement with a record sheet 67. Preferably, said record sheet is continuously moved in the direction of the arrow at a constant speed by means of a constant speed motor or clock mechanism 68 which may be of any common well-known construction and which is adapted to drive a roller 69. It will accordingly be seen that stylus 66 is normally effective to make a straight line 70 on sheet 67 and that when the same is moved up and down by the momentary energization of solenoid 55, an indication of the character shown at 71 is produced.

In the operation of the above-described apparatus, spindle 14 and, hence, shaft 23 are rotated, when wind impinges upon cups 21, at a speed proportional to the velocity of the wind currents, it having been assumed for the purposes of description that the parts are so designed that shaft 23 makes 10 revolutions for each mile of wind that passes cups 21. Since the speed ratio between shaft 23 and gear 27 is also assumed, by way of example, to be 100 to 1, it will be seen that a pin 32 will engage stud 50 for momentarily closing contacts 38, 42 after each mile of wind that passes. The closing of said contacts causes solenoids 54 and 55 to be energized, whereby the former is rendered effective to actuate counter 62 to increase the total miles indicated thereon by one unit and the latter is rendered effective to actuate stylus 66 to produce an indication 71. It will accordingly be seen that in the present embodiment each of the indications 71 on record sheet 67 will be indicative of the passing of one mile of wind. At the end of every ninth mile of wind the circuit to said solenoids is closed and held in closed position by bridge 33, thereby actuating counter 62 to register said ninth mile and to raise stylus 66. By thus maintaining the circuit closed during the passing of each tenth mile of wind, stylus 66 is caused to produce a line 72 in the plane of the tops of indications 71. A distinguishing indication is thus made for every tenth mile and accordingly facilitates the making of a summation of the total number of miles of wind recorded over an extended period of time.

In order that said tenth mile of wind may be registered on counter 62, stud 50 is permitted to momentarily drop into groove 34 during the passing of said tenth mile of wind to thereby momentarily open and again close the transmitting circuit and, hence, actuate ratchet 61. The momentary opening of the circuit in this manner produces a dip 73 in the tenth mile indication which interrupts the continuity of line 72. An indication is thus produced after every predetermined number of revolutions of shaft 23 or spindle 14 which may be readily distinguished from the others, this being true even with respect to an indication provided as a result of a long contacting period that might result during a lull in the wind while stud 50 is riding on one of members 32. It will also be noted that the distance between indications 71 may be employed, in connection with the speed of the movement of recording sheet 67 by means 68, to compute the average velocity of the wind during a given period of time.

In addition to the above-described mechanism whereby an electric circuit is closed and opened in a predetermined novel manner relative to the movements of a rotating member, another switch means may be provided whereby an indication for each predetermined fractional portion of each mile of wind passing cups 21 may be obtained. The switch means shown for this latter purpose is of substantially the same construction as the switch means above described and will accordingly not be described in detail but primed numerals are employed in the drawings to designate parts thereof which correspond to parts of the switch means already described and which bear the same numeral.

A cam wheel 74, which, in the embodiment illustrated, has six equally spaced lobes 75 on the periphery thereof, is mounted on shaft 23 for rotation therewith and is constantly engaged by stud 50' which depends from contact bar 44'. Thus if the reduction ratio between worm 15 and gear 25 is, as assumed above, such that shaft 23 rotates 10 revolutions for every mile of wind impinging upon cups 21, the circuit including contacts 38' and 42' will be closed once for each 1/60 mile of wind. The electrical impulses produced by the closing of said contacts may be transmitted to a totalizing counter or the same may be employed to actuate recording mechanism of the character above described.

There is thus provided novel measuring and recording apparatus whereby each predetermined number of revolutions of a shaft, for example, may be registered by a totalizing counter and whereby a permanent record, having distinctive indications for every predetermined number of revolutions of the shaft, may be made, to thereby render said record quickly and accurately readable. Although only a single embodiment of the invention is illustrated and described, it is to be expressly understood that the same is not limited thereto but that various changes, such as in the design and arrangement of parts illustrated, may be made without departing from the spirit and scope of the invention, as will now be understood by those skilled in the art. For a definition of the limits of the invention reference will be had primarily to the appended claims.

What is claimed is:

1. In a device of the character described, a rotatable member, an electric circuit including a source of electric energy, an electro-magnet and switch means for opening and closing said circuit to energize and de-energize said electro-magnet, cyclically operable means interposed between said member and switch means for momentarily closing the latter a predetermined number of times during each cycle of operation of said cyclically operable means, each closure being after a predetermined number of revolutions of said member, and for then closing said switch means during an equal number of revolutions of said member except momentarily when the same is opened, a movable record sheet, and a recording stylus adapted to engage said record sheet and to be actuated by said electro-magnet.

2. In apparatus of the class described, a rotatable element, means for rotating said element, an electric circuit including a switch means, a source of electric energy and an electro-magnet, recording means adapted to be actuated by said magnet, and means for actuating said switch means in a predetermined manner including a rotatable member driven by said element, a plurality of cams mounted on said member and adapted to momentarily close said switch means upon rotation of said element and an elongated cam on said member having a depression intermediate the ends thereof for closing said switch means during a more extended period of time and for opening the same momentarily during said period.

3. In a device of the character described, a rotatable member, switch means, and means controlled by said member for momentarily closing said switch means after each predetermined number of revolutions thereof and then for closing and momentarily opening said switch during a predetermined number of revolutions of said member after a predetermined multiple of said predetermined number of revolutions, recording means, and means for controlling said recording means, said recording means being momentarily actuated upon the momentary closing of said switch to record said predetermined number of revolutions and said recording means being actuated upon the closing and momentary opening of said switch to produce a characteristic recordation of said multiple of said predetermined number of revolutions.

4. In a device of the character described, a rotatable member, switch means, means controlled by said member for momentarily operating said switch means after each predetermined number of revolutions thereof and for then operating and only momentarily returning said switch means to non-operative position during a predetermined number of revolutions of said member after a predetermined multiple of said predetermined number of revolutions, and means responsive to said switch means and being actuated upon the momentary operation thereof to present an indication of said predetermined number of revolutions and actuated upon said operation and momentary returning to present a characteristic indication of said multiple of said predetermined number of revolutions.

RALPH R. CHAPPELL.
RUTGER B. COLT.